F. MALLET.
SCRAPER.
APPLICATION FILED FEB. 9, 1914.

1,171,738. Patented Feb. 15, 1916.

Witnesses:
M. A. Hefling
Edw. W. Kibbey

Inventor:
François Mallet
by B. Singer Atty.

UNITED STATES PATENT OFFICE.

FRANÇOIS MALLET, OF PARIS, FRANCE.

SCRAPER.

1,171,738. Specification of Letters Patent. Patented Feb. 15, 1916.

Application filed February 9, 1914. Serial No. 817,599.

*To all whom it may concern:*

Be it known that I, FRANÇOIS MALLET, engineer, 42 Rue Louis Blanc, Paris, France, have invented new and useful Improvements in or Relating to Scrapers.

The object of the present invention is a scraper in which the blade is articulated to the handle by means of a ball socket or universal joint at hard friction, so as to enable said handle to take any desired inclined position as to the said blade. In a great number of cases, the use of such a scraper allows the scraping by maintaining the tool sufficiently spaced from the wall to be scraped, in order to avoid any friction of the fingers on this wall during the work.

By way of example, the preferred forms of the invention are represented in the annexed drawings in which—

Figure 1:
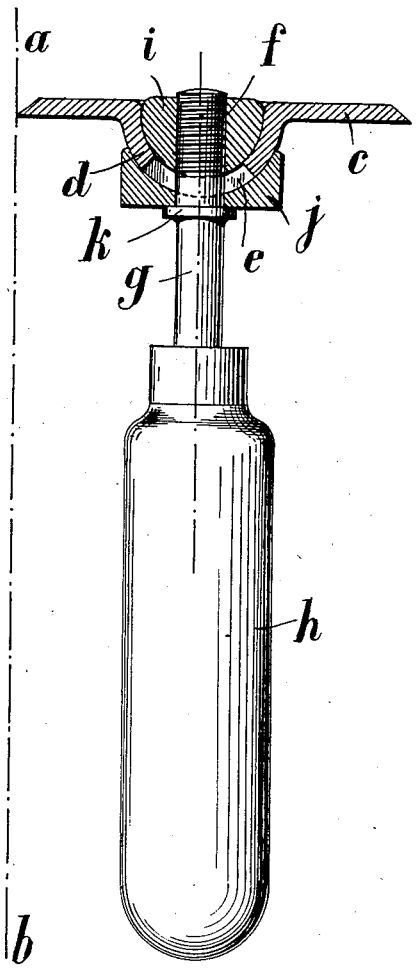
Figure 2:
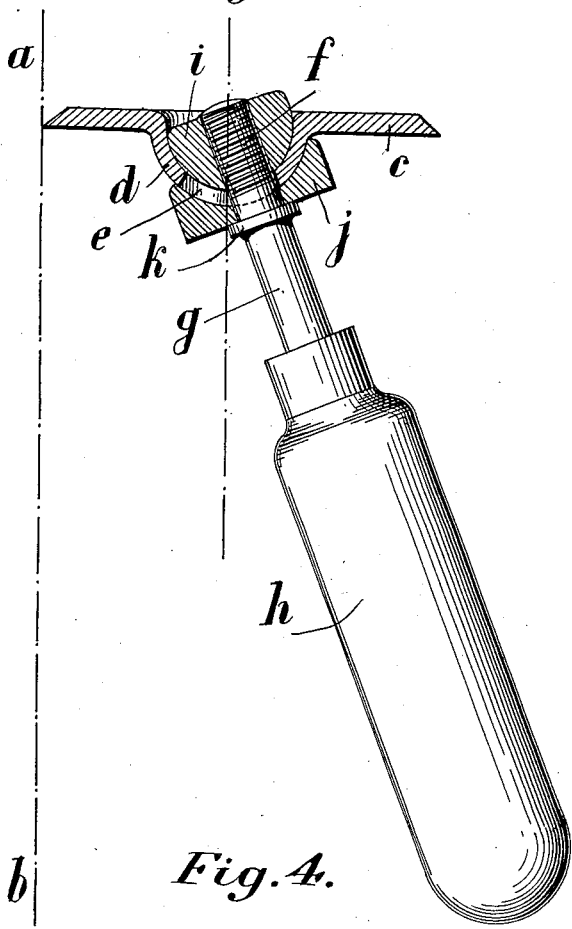
Figure 3:
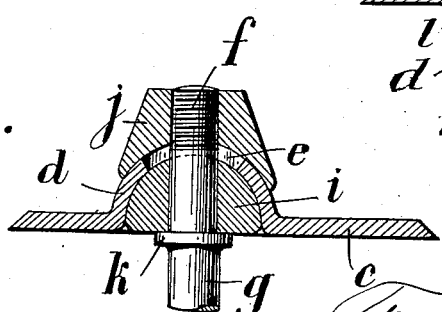
Figure 4:
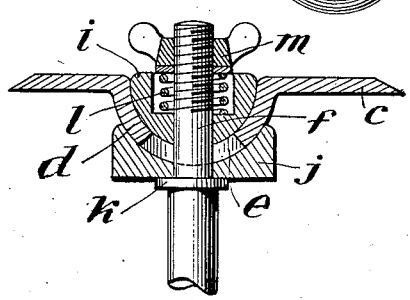

Figure 1 is a sectional partial axial view, showing the scraper with its handle perpendicular to the blade plane. Fig. 2 is a similar view, but in which the handle is in an inclined position as regards the blade plane. Fig. 3 is a sectional view of a modified ball and socket joint assembling blade and handle. Fig. 4 is a sectional view of another modification in which the rubbing surfaces of the ball and socket joint are connected under the adjustable pressure of a spring.

In the annexed drawings: $a$, $b$ shows schematically the surface of the wall to be scraped; $c$ is the scraper blade provided in its center with a hemispherical hollow bulge $d$; the said bulge is bored in its middle to present a slit or opening $e$ forming passage for the end $f$ of the rod $g$ of the handle $h$. A ball $i$ forming part of the end $f$ of rod $g$, is lodged exactly in the hollowness of the bulge $d$, while a cap $j$ in which cross the rod $g$ and fixed by its collar $k$, is secured on the said hemispherical bulge. The wall of said bulge is consequently maintained between the ball $i$ and the cap $j$. The degree of friction between the surfaces of bulge $d$ and ball $i$ is regulated for example, by screwing the said ball $i$ on the screwed end $f$ of the rod $g$. The ball $i$, cap $j$ and hollow bulge $d$ may be inserted as regards the blade $c$, as shown in Fig. 3.

The degree of friction between the surfaces of ball socket joint which come in contact may be adjusted by means of a nut $m$ screwing on the screwed end $f$ of rod $g$ and acting on the said ball by a spring $l$, as shown in Fig. 4. It is understood that the friction of the joint surfaces is so regulated at will, to give to said joint a sufficient rigidity to hold the handle in a constant inclined position, whatever the pressure exerted on the handle $h$ during the work.

I declare that what I claim is:

1. A scraper, comprising in combination, a blade having a hemispherical hollow bulge and having an aperture at the center of the bulge, a rod adapted to extend through said aperture, a cup member disposed on said rod and having a cavity therein adapted to receive the convex surface of said bulge, a hemispherical member disposed on said rod and lying within said bulge, and means for clamping the walls of said bulge tightly between said cup member and hemispherical member.

2. A scraper, comprising in combination, a blade having a hemispherical hollow bulge with an elongated aperture at the center thereof, a rod having a threaded portion adapted to extend through and beyond said aperture and bulge, a collar on said rod, a cup member disposed on said rod and so arranged as to have its upper surface abut said collar and having in its lower surface a cavity adapted to receive the convex surface of said bulge, a hemispherical member disposed on said rod and lying within said bulge, a clamping nut disposed on said threaded portion, and a retractile member disposed on said rod between said hemispherical member and clamping nut, substantially as described.

In testimony whereof I affix my signature in presence of two witnesses.

FRANÇOIS MALLET.

Witnesses:
GABRIEL DILLAIN,
HANSON C. COXE.